United States Patent
Takano (10) Patent No.: US 8,314,882 B2
(45) Date of Patent: Nov. 20, 2012

(54) IMAGING APPARATUS WITH ACCESSORY SHOE

(75) Inventor: Hironori Takano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/266,696

(22) Filed: Nov. 7, 2008

(65) Prior Publication Data

US 2009/0128688 A1 May 21, 2009

(30) Foreign Application Priority Data

Nov. 16, 2007 (JP) ................................ 2007-298530

(51) Int. Cl.
*H04N 5/225* (2006.01)
*G03B 17/00* (2006.01)
*G03B 11/00* (2006.01)

(52) U.S. Cl. .................... 348/375; 396/422; 396/544

(58) Field of Classification Search .................. 348/370, 348/371, 373, 375, 376; 396/422, 544
See application file for complete search history.

(56) References Cited

U.S. PATENT DOCUMENTS

| | | | | |
|---|---|---|---|---|
| 7,623,773 B2 * | 11/2009 | Yamashita | ........................ | 396/29 |
| 7,715,705 B2 * | 5/2010 | Yasutomi et al. | ............. | 348/371 |
| 7,753,599 B2 * | 7/2010 | Segawa et al. | ................ | 396/422 |
| 7,903,966 B2 * | 3/2011 | Takano | .......................... | 396/544 |
| 8,098,326 B2 * | 1/2012 | Takashima et al. | ........... | 348/375 |
| 2002/0081912 A1 * | 6/2002 | Sakurai et al. | ................ | 439/752 |
| 2002/0168185 A1 * | 11/2002 | Hagiuda et al. | ............... | 396/155 |
| 2005/0237426 A1 * | 10/2005 | Takashima et al. | ........... | 348/375 |
| 2009/0169199 A1 * | 7/2009 | Takano | ......................... | 396/544 |

FOREIGN PATENT DOCUMENTS

| | | | | |
|---|---|---|---|---|
| JP | 07218992 | A | * | 8/1995 |
| JP | 10221756 | A | * | 8/1998 |
| JP | 2005-236532 | | | 9/2005 |
| JP | 2005-315989 | | | 11/2005 |
| JP | 2006-079053 | | | 3/2006 |
| JP | 2006-179393 | A | | 7/2006 |

OTHER PUBLICATIONS

The above reference was cited in a Sep. 15, 2011 Chinese Office Action, which is enclosed with an English Translation, that issued in Chinese Patent Application No. 201010254959.X.

* cited by examiner

*Primary Examiner* — John Villecco
(74) *Attorney, Agent, or Firm* — Cowan, Liebowitz & Latman, P.C.

(57) ABSTRACT

An imaging apparatus includes an accessory shoe that includes an engagement member configured to be engaged with and hold an accessory unit that slides in an attachment direction relative to the accessory shoe, and an imaging apparatus side connector electrically connected to an accessory side connector of the accessory unit. The engagement member includes first and second engagement members provided apart from each other via a space in which the accessory unit slides, and a third engagement member that is provided on a front side of the first and second engagement members in the attachment direction, projects in a direction opposite to the attachment direction, and covers the imaging apparatus side connector. The third engagement member is engaged with the accessory side connector that is inserted into an engagement space formed between the third engagement member and the imaging apparatus side connector.

5 Claims, 12 Drawing Sheets

IMAGING APPARATUS WITH ACCESSORY SHOE

BACKGROUND OF THE INVENTION

1. Field of the Invention

The present invention relates to an imaging apparatus having an accessory shoe, to which an accessory unit, such as an illumination lamp and a microphone, is attachable.

2. Description of the Related Art

An imaging apparatus, such as a video camera, usually has an accessory shoe, to which an accessory unit, such as a lamp that illuminates an object and a microphone that records voices, is attachable. See Japanese Patent Laid-Open Nos. 2005-315989, 2006-79053, and 2005-236532.

Figure 13:
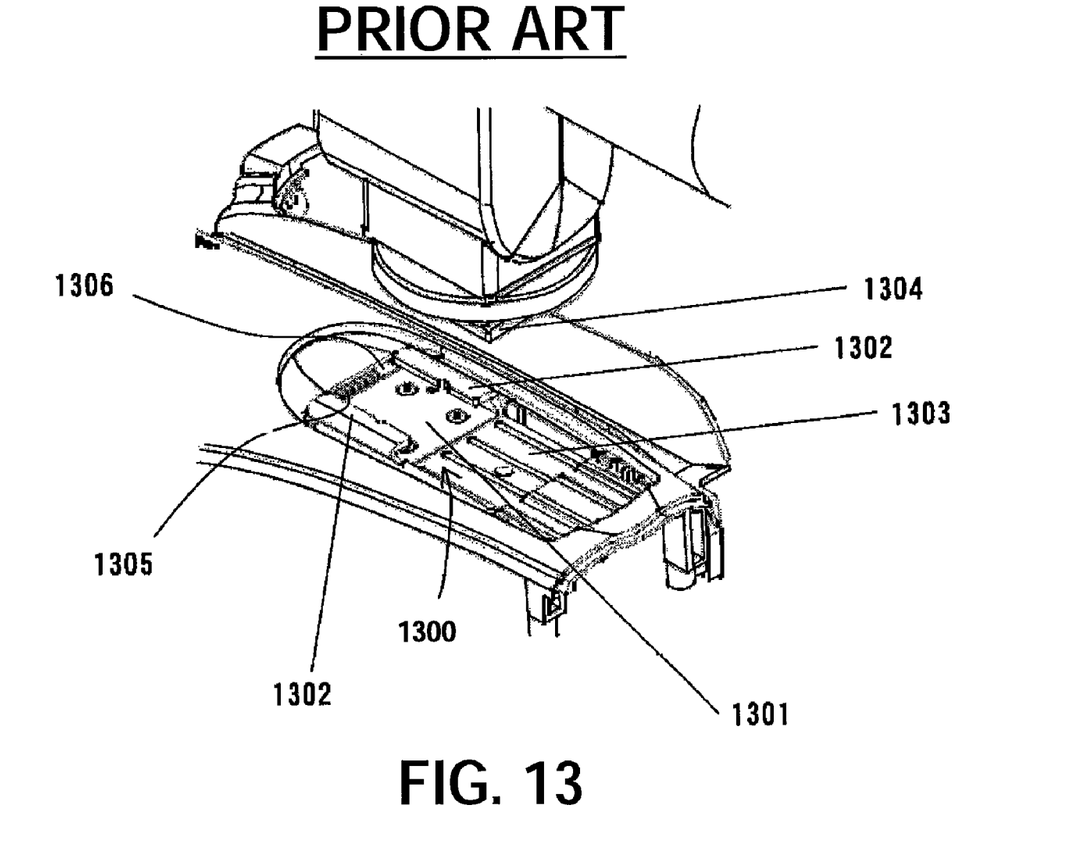
FIG. 13 is an overview of an accessory shoe in a conventional video camera.

FIG. 13 shows a conventional, general accessory shoe. The accessory shoe has an engagement plate 1300 that is engageable with and holds an accessory unit. The engagement plate 1300 includes an attachment base surface 1301, and a pair of engagement members (referred to as "camera side engagement members" hereinafter) 1302 at both sides of the attachment base surface 1301. A contact group (referred to as a "camera side contact group" hereinafter) 1305 for power supply and communications is located at the front end of the accessory shoe or in front of the engagement plate 1300. The camera side contact group 1305 is held by a contact holder 1306.

On the other hand, the accessory unit includes an engagement member (referred to as an "accessory side engagement member" hereinafter) engageable with the accessory shoe. An accessory side contact group (not shown) is provided on the front lower surface of the accessory side engagement member 1304, and electrically connectible to the camera side contact group 1305.

In attaching the accessory unit to the accessory shoe, the accessory unit is slid to the front relative to the engagement plate 1300, and the accessory side engagement member 1304 is inserted into between each camera side engagement member 1302 and the attachment base surface 1301. Thereby, the accessory side engagement member 1304 is engaged with the camera side engagement members 1302.

In addition, the accessory side contact group is electrically connected to the camera side contact group 1305 by sliding the accessory unit to an engagement position where the entire accessory side engagement member 1304 is engaged with the entire camera side engagement members 1302.

This accessory shoe requires long engagement members in the sliding direction of the accessory unit so as to stabilize the accessory unit attached to the accessory shoe and to secure the connection strength with the accessory unit to some extent. Therefore, the accessory shoe becomes larger, preventing a miniaturization of the imaging apparatus.

In addition, in order to attach the accessory unit to the accessory shoe, a wide space (designated by numeral 1303 in FIG. 13 and referred to as a "pre-engagement space" hereinafter) as long as the engagement members is necessary behind the accessory shoe. This wide pre-engagement space in the imaging apparatus further prevents the miniaturization of the imaging apparatus.

SUMMARY OF THE INVENTION

The present invention is directed to a small imaging apparatus that has an accessory shoe and can reduce a pre-engagement space necessary for an attachment of an accessory unit.

An imaging apparatus according to one aspect of the present invention includes an accessory shoe that includes an engagement member configured to be engaged with and hold an accessory unit that slides in an attachment direction relative to the accessory shoe, and an imaging apparatus side connector electrically connected to an accessory side connector of the accessory unit. The engagement member includes first and second engagement members provided apart from each other via a space in which the accessory unit slides, and a third engagement member that is provided on a front side of the first and second engagement members in the attachment direction, projects in a direction opposite to the attachment direction, and covers the imaging apparatus side connector. The third engagement member is engaged with the accessory side connector that is inserted into an engagement space formed between the third engagement member and the imaging apparatus side connector.

Further features of the present invention will become apparent from the following description of exemplary embodiments (with reference to the attached drawings).

DESCRIPTION OF THE EMBODIMENTS

A description will now be given of an embodiment of the present invention.

Figure 12:
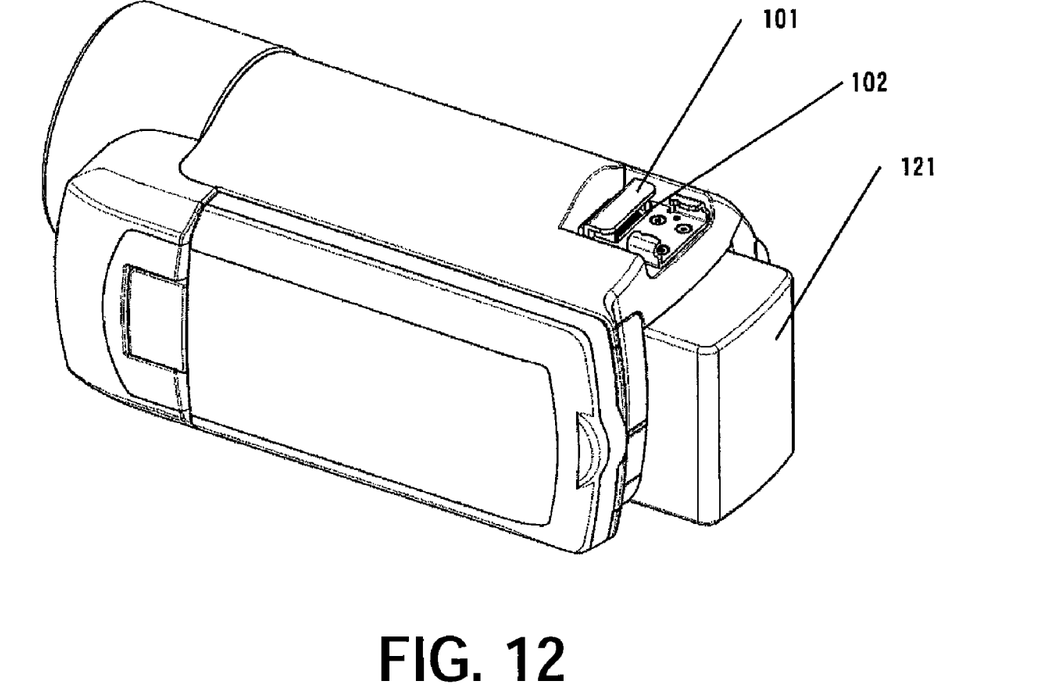
FIG. 12 is an overview of a video camera having the accessory shoe according to the embodiment.

FIG. 12 shows an overview of a video camera as an imaging apparatus according to an embodiment of the present invention.

In FIG. 12, 120 denotes a video camera body, and 121 denotes a battery pack as a power source of the video camera 120. 101 denotes an engagement plate, which will be described later, and 102 denotes a contact holder.

Figure 1:
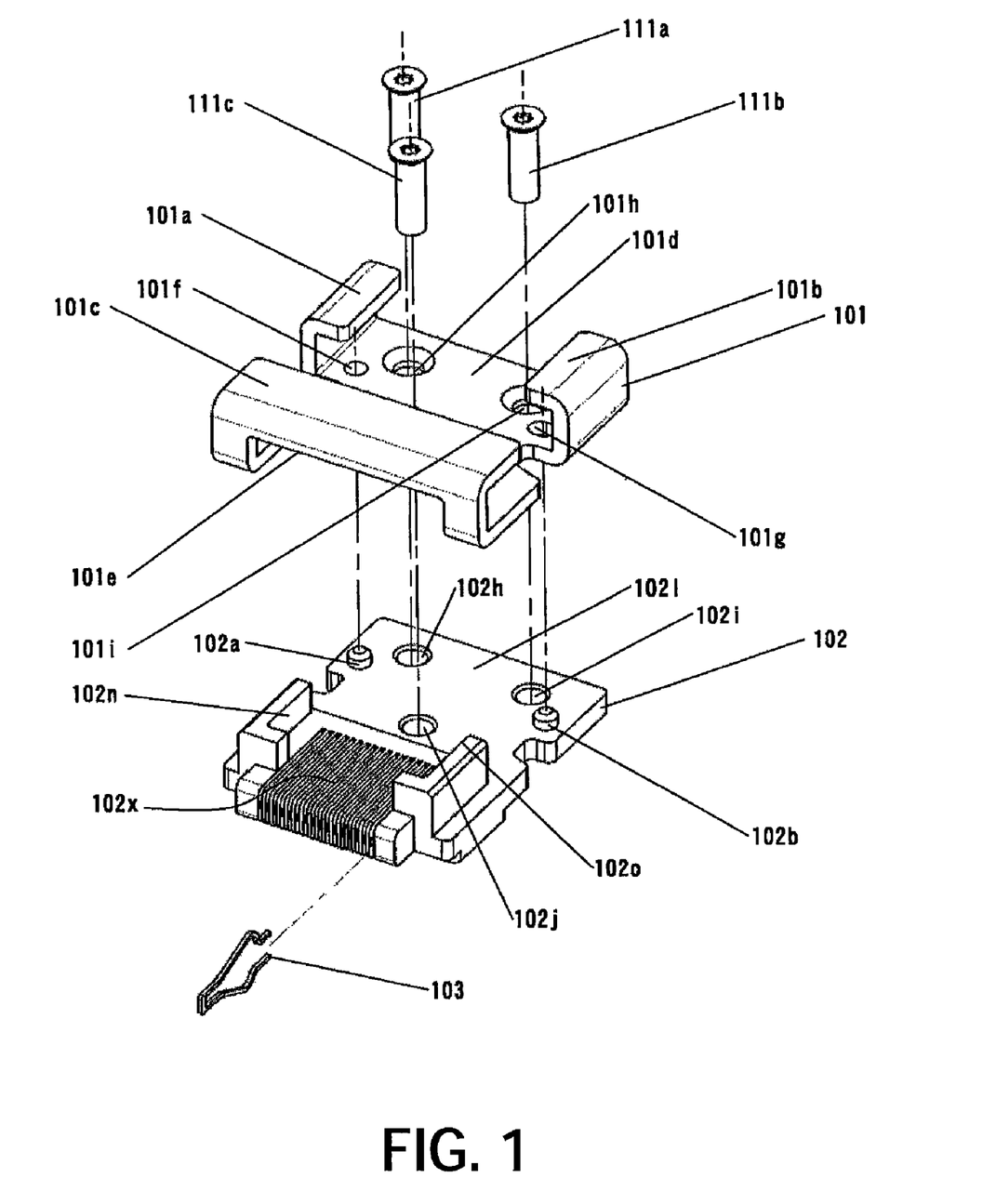
FIG. 1 is an exploded perspective view of an accessory shoe according to one embodiment of the present invention.
Figure 2:
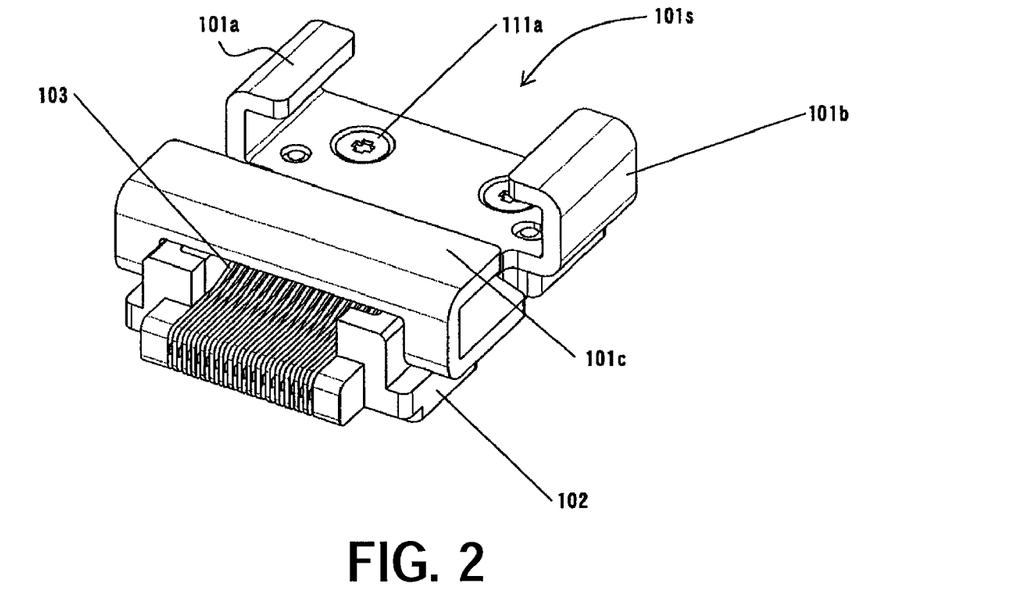
FIG. 2 is a perspective view of the accessory shoe according to the embodiment viewed from the upper front side.
Figure 3:
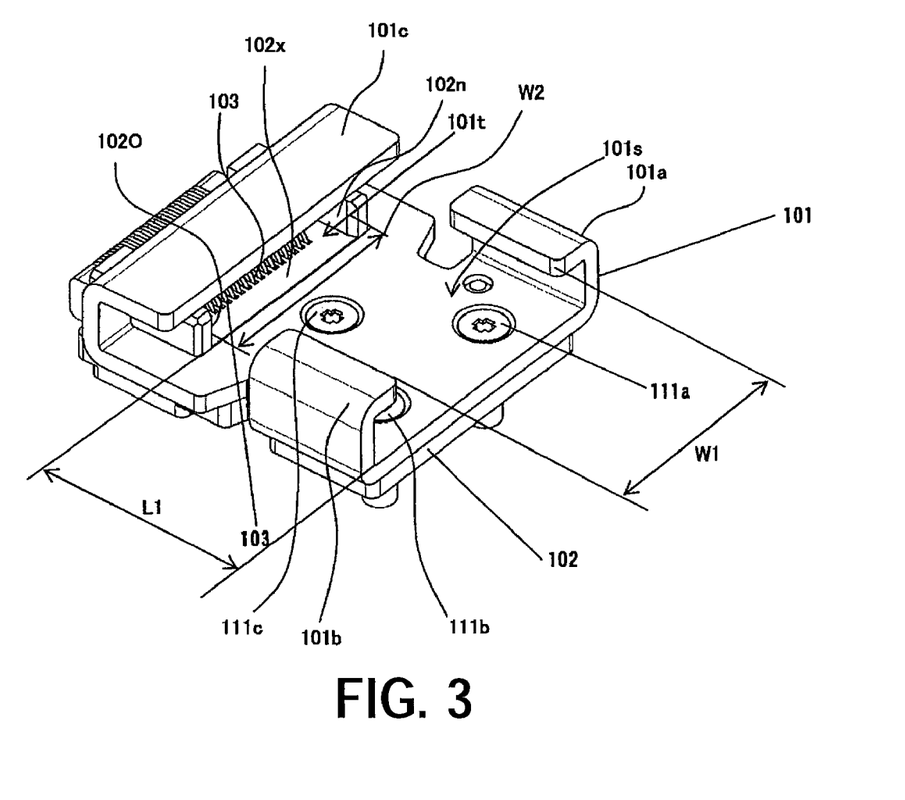
FIG. 3 is a perspective view of the accessory shoe according to the embodiment viewed from the upper rear side.
Figure 4:
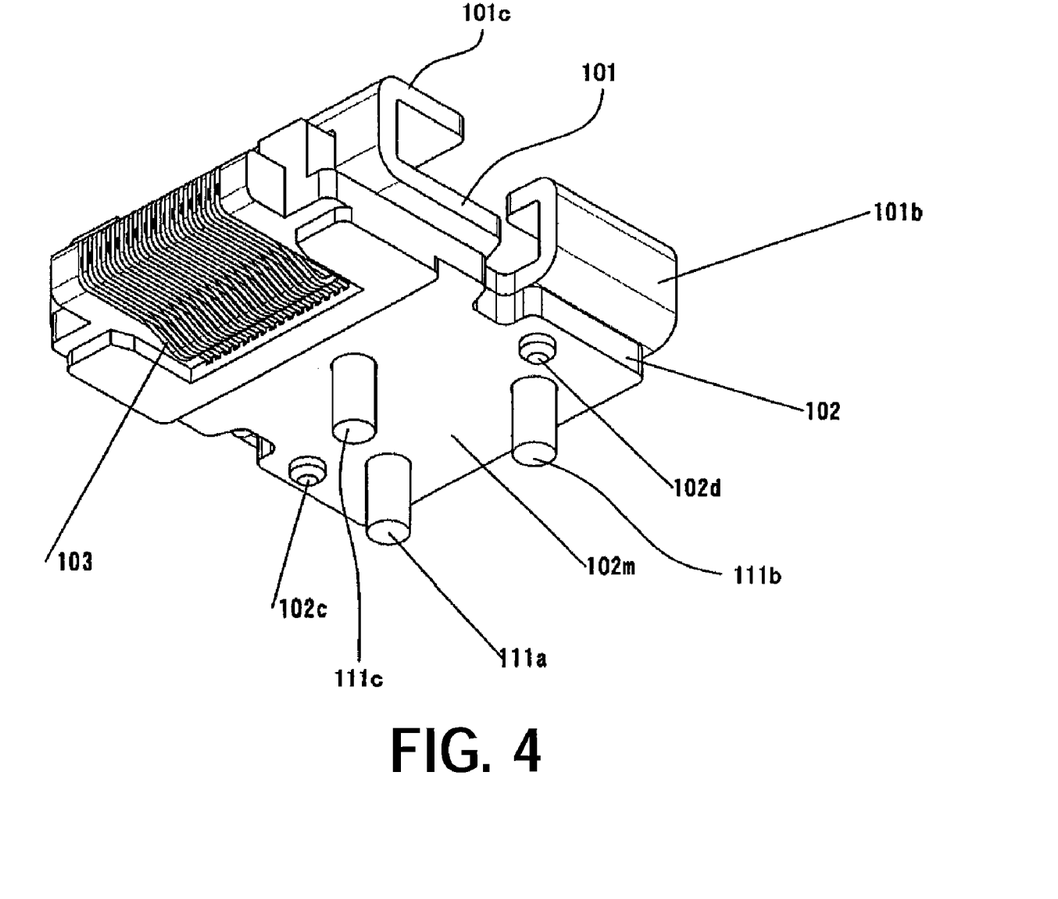
FIG. 4 is a perspective view of the accessory shoe according to the embodiment viewed from the lower front side.
Figure 5:
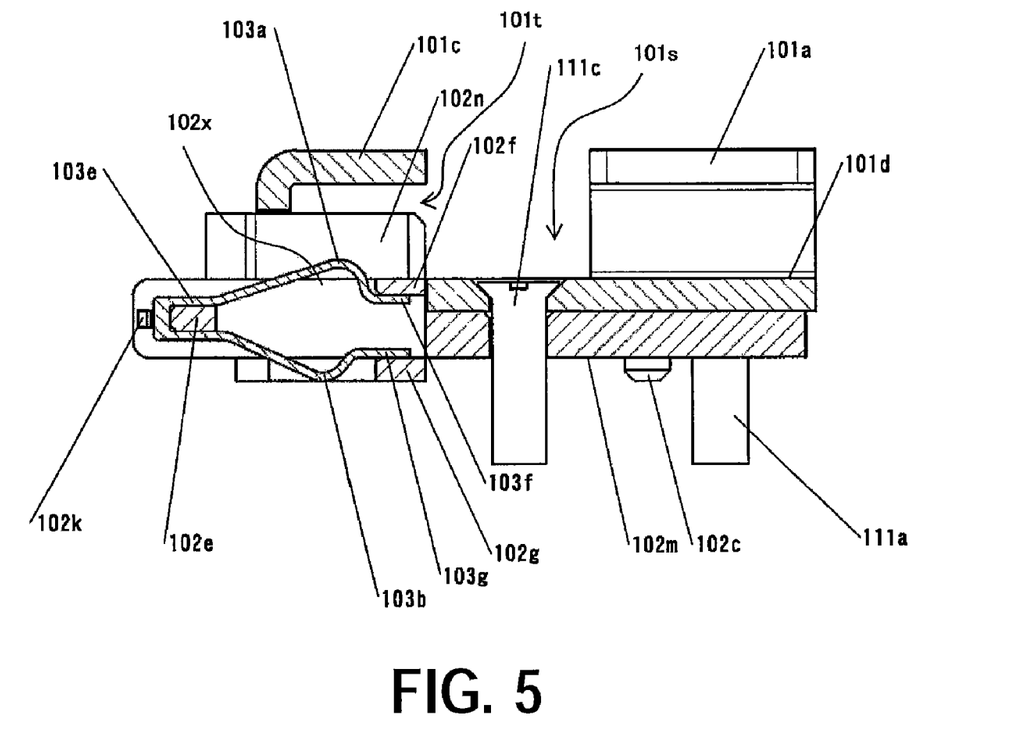
FIG. 5 is a sectional view of the accessory shoe according to the embodiment.

FIG. 1 is an exploded view of the accessory shoe. FIGS. 2, 3, and 4 show the assembled accessory shoe viewed from different directions. FIG. 5 shows a section of the accessory shoe.

In the following description, a direction corresponding to the left side in the section shown in FIG. 5 is assigned to the "front," and a direction corresponding to the right side in FIG. 5 is assigned to the "back." The "front" is an object direction in the video camera, and an attachment direction in which the accessory unit is slid and attached.

In FIGS. 1 to 5, 101 denotes an engagement plate as an engagement member, which is wholly made of a steel plate, such as SPCC and SUS. 102 denotes a contact holder that is wholly made of a thermoplastic resin material, such as PBT and LCP. 103 denotes a contact or contacts made of a metallic material having a good spring characteristic and conductivity, such as phosphor bronze and copper-titanium alloys. The contacts 103 are held by the contact holder 102.

The following description adds a "camera side" to each component's name of the camera, and an "accessory side" to each component's name of the accessory unit.

The camera side engagement plate 101 includes a planar slide part (attachment base surface) 101d, and a pair of camera side engagement members (first and second engagement members) 101a and 101b that are arranged at both side of a sliding space 101s as an upper space of the slide part 101d. The camera side engagement members 101a and 101b are bent upwardly relative to the slide part 101d, and then bent parallel to the slide part 101d at their tips towards the inside of the sliding space 101s (so that these tips oppose to each other). An arrangement direction of the camera side engagement members 101a and 101b via the sliding space 101s will be referred to as a "shoe width direction" hereinafter.

A camera side engagement member (third engagement member) 101c is provided in front of the camera side engagement members 101a and 101b in the attachment direction front side in the camera side engagement plate 101. The camera side engagement member 101c is bent upwardly relative to the slide part 101d, and then bent parallel to the slide part 101d at its tip to the back or in a direction opposite to the attachment direction or towards the engagement members 101a and 101b.

An opening 101e is formed under the camera side engagement member 101c in the camera side engagement plate 101.

A front part (referred to as a "contact holding part" hereinafter) 102x of the camera side contact holder 102 is inserted into the opening 101e from the bottom of the camera side engagement plate 101. Thereby, the tip of the camera side engagement member 101c that is bent parallel to the slide part 101d (which is referred to as a "bent tip" hereinafter) faces the contact holding part 102x of the camera side contact holder 102 in the perpendicular direction. An engagement space 101t connected to the camera side sliding space 101s is formed between the bent tip of the camera side engagement member 101c and the contact holding part 102x of the camera side contact holder 102. The contact holding part 102x of the camera side contact holder 102 and the top surfaces of the camera side contacts 103 (contact members 103a) held by the contact holding part 102x expose to the inside of the engagement space 101t through the opening 101e from the outside of the engagement space 101t.

The contact holding part 102x of the camera side contact holder 102 and the camera side contacts 103 held there constitute the camera side connector (imaging apparatus side connector) to be electrically connected to an accessory side connector, which will be described later.

Moreover, the slide part 101d of the camera side engagement plate 101 has positioning holes 101f and 101g, and fixing holes 101h, 101i, and 101j. The camera side engagement plate 101 is positioned to the camera side contact holder 102 by inserting projections 102a and 102b that are formed on the top surface of the camera side contact holder 102 into the positioning holes 101f and 101g. In addition, screws 111a, 111b, and 111c are inserted from the top into the fixing holes 101h, 101i and 101j so as to fix the camera side engagement plate 101 onto the camera body.

The camera side contact holder 102 aligns and holds plural camera side contacts 103 in the shoe width direction at a predetermined pitch for power supply to the accessory unit and communications of the communication signals of the accessory unit. The camera side contact holder 102 has a partition wall between two adjacent camera side contacts 103, and prevents shortcircuits of the camera side contacts 103.

As shown in FIG. 5, the contact holding part 102x of the camera side contact holder 102 has a contact engagement member 102e, contact engagement stops 102f and 102g, and a contact drop-off preventive member 102k.

The contact engagement member 102e is engaged with the inside of a crotch of each bifurcated camera side contact 103, and holds the camera side contacts 103. The contact engagement stops 102f and 102g are engaged with ends 103f and 103g of the contacts 103a and 103b so as to hold the two legs (referred to as "contact members" hereinafter) of the camera side contact 103 in a charged state (elastic deformation state).

The contact member 103a contacts an accessory side contact 603, which will be described later. Therefore, when the contact member 103a is charged in a non-contact state with the accessory side contact 603 (in the initial state), a stable contact pressure (force) can be secured when it contacts the accessory side contact 603.

On the other hand, the contact 103b contacts a (flexible) substrate FPC (not shown) on the camera body side (not shown). Therefore, when the contact part 103b is charged in the non-contact state with the substrate FPC, a stable contact pressure (force) can be secured when it contacts the substrate FPC.

The contact drop-off preventive member 102k has a wedge-shaped section, and prevents the camera side contact 103 from dropping off from the camera side contact holder 102.

In addition, a top surface 102l of the camera side contact holder 102 contacts a bottom surface of the camera side engagement plate 101. This top surface 102l has the above projections 102a and 102b. Moreover, a bottom surface 102m of the camera side contact holder 102 has projections 102c and 102c used for positioning to the camera body.

Moreover, the camera side contact holder 102 has fixing holes 102h, 102i, and 102j, into which the above screws 111a, 111b, and 111c are inserted.

Guide wall surfaces 102n and 102o are formed on the top surface of the contact holding part 102x of the camera side contact holder 102 at both sides of the contacts 103a of the plural camera side contacts 103 and the above engagement space 101t in the shoe width direction, and extend in a direction from the front to the back.

In inserting the accessory side contact holder 601, which will be described later, into the above engagement space 101t, the guide wall surfaces 102n and 102o guide the guide wall surfaces 601n and 601o of the accessory side contact holder 601, thereby preventing a positional shift and unsteadiness between the camera side contact holder 102 and the accessory side contact holder 601 in the shoe width direction. In other words, the camera side contacts 103 held by the camera side contact holder 102 can be precisely maintained in contact with the accessory side contacts 603 that corresponds to the camera side contact 103 and is held by the accessory side contact holder 601.

Figure 6:
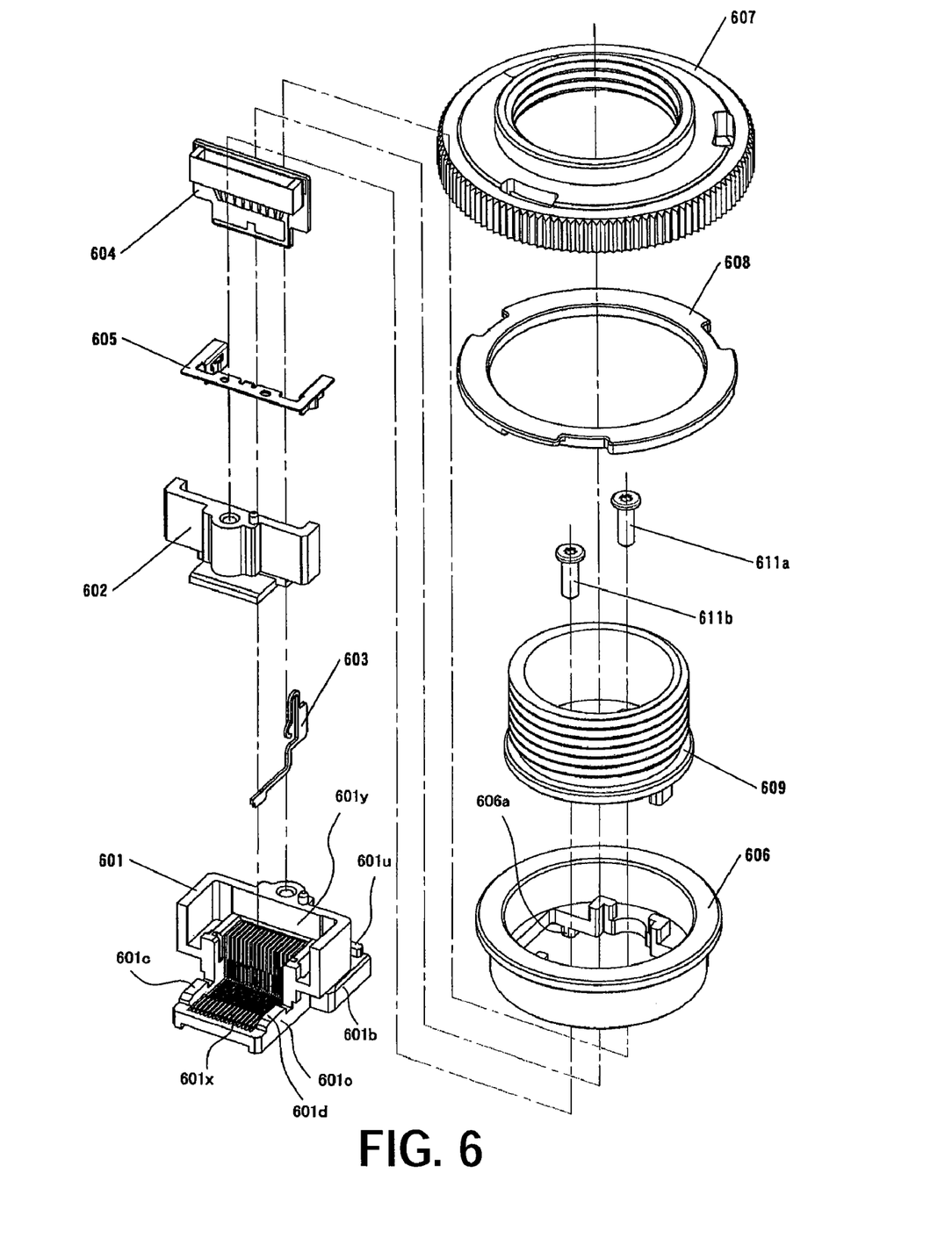
FIG. 6 is an exploded perspective view of an accessory side shoe attachment member.
Figure 7:
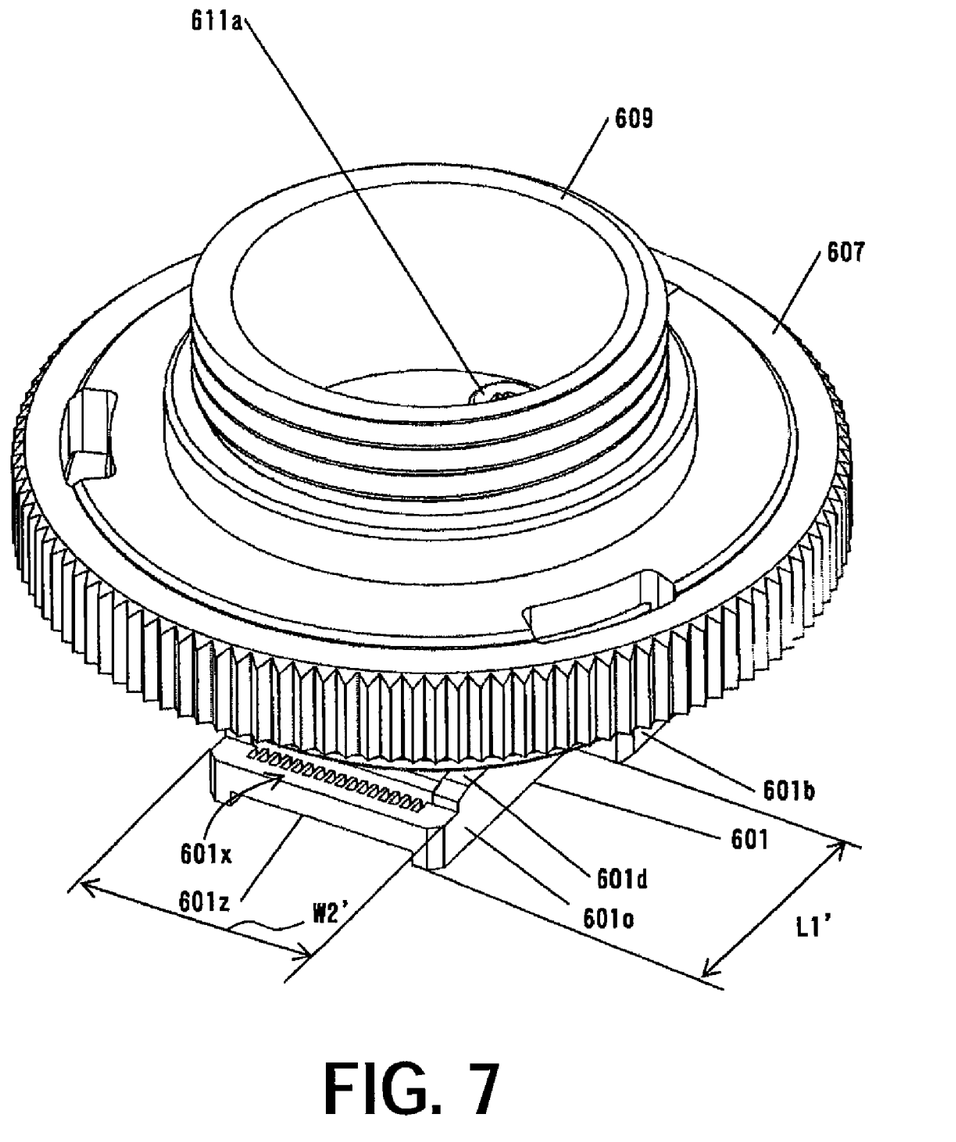
FIG. 7 is a perspective view of the shoe attachment member according to the embodiment viewed from the upper front side.
Figure 8:
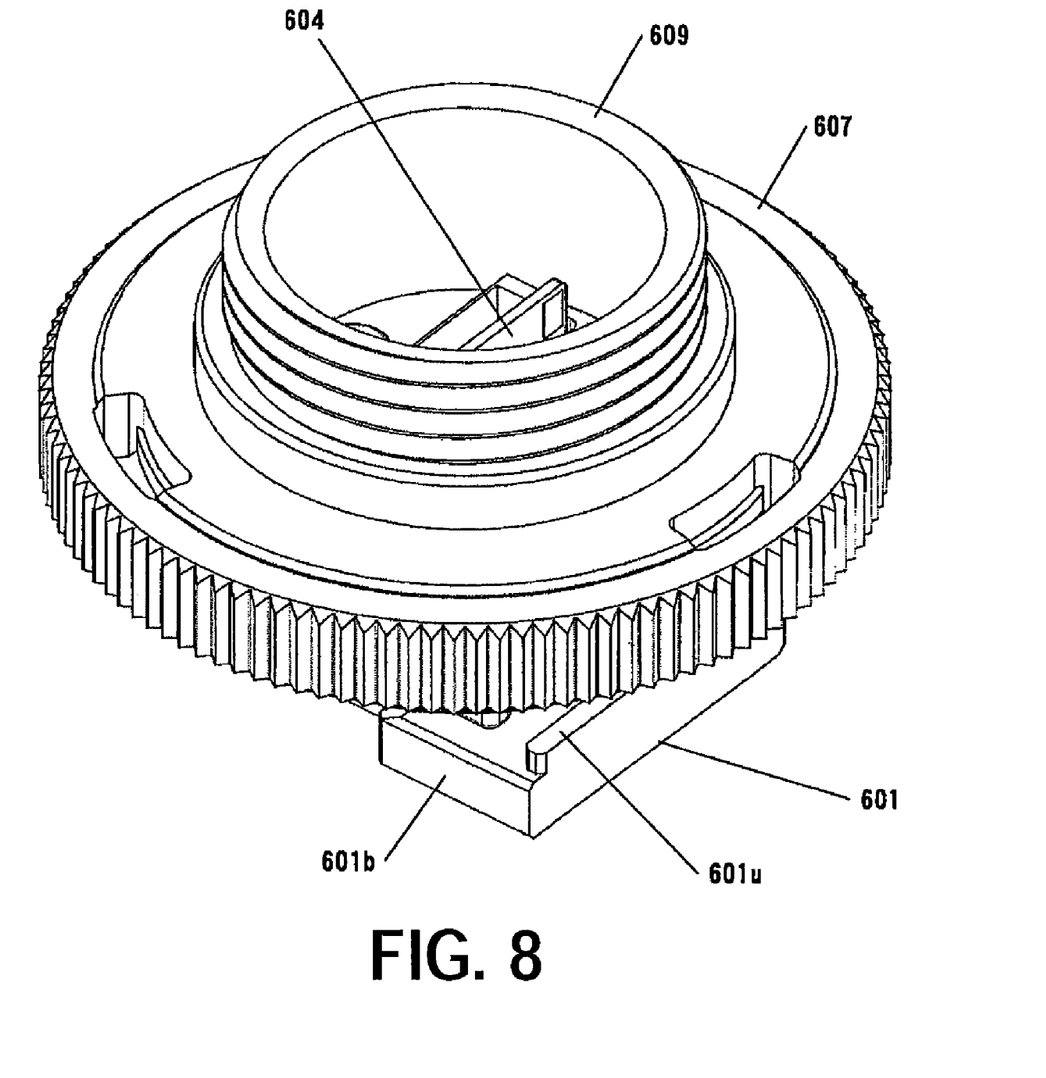
FIG. 8 is a perspective view of the shoe attachment member according to the embodiment viewed from the upper rear side.
Figure 9:
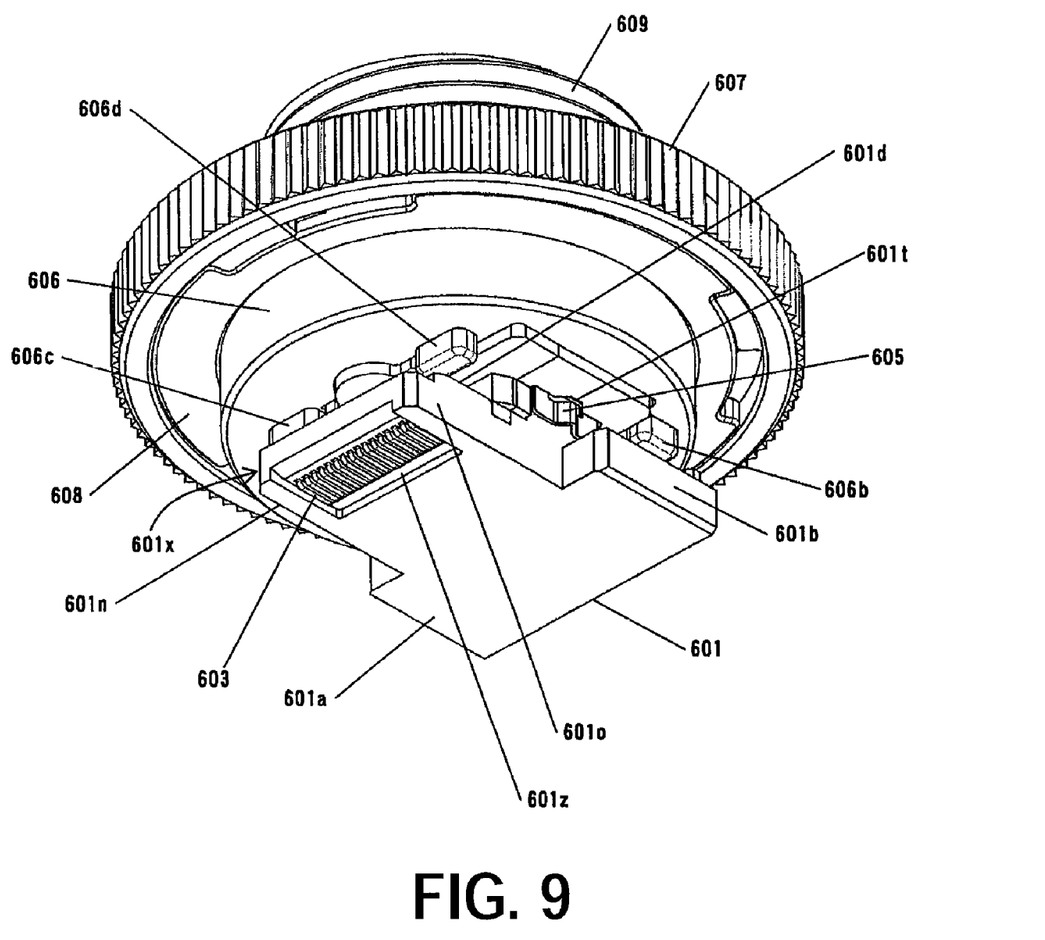
FIG. 9 is a perspective view of the shoe attachment member according to the embodiment viewed from the lower front side.
Figure 10:
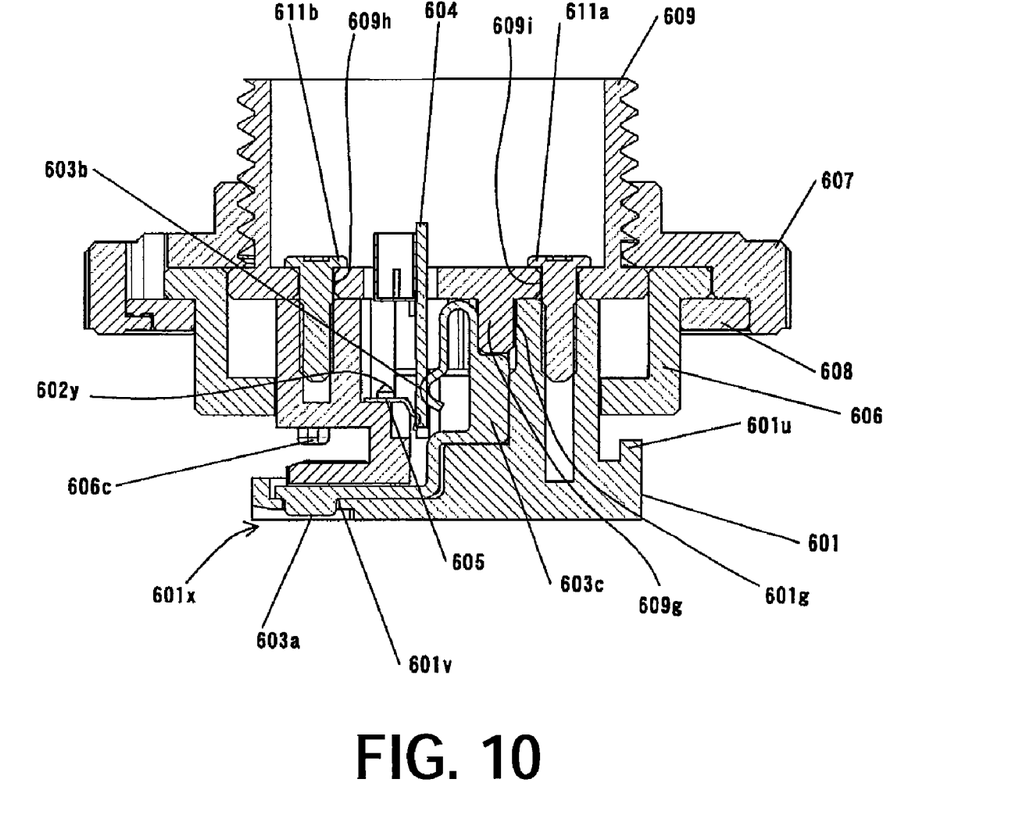
FIG. 10 is a sectional view of the shoe attachment member according to the embodiment.

FIG. 6 is an exploded view of the shoe attachment member in the accessory unit to be attached to the accessory shoe according to this embodiment. FIGS. 7-9 show the shoe attachment member viewed from different directions. FIG. 10 shows a section of the shoe attachment member.

In the following description, a direction corresponding to the left side in the section shown in FIG. 10 is assigned to the "front," and a direction corresponding to the right side in FIG. 10 is assigned to the "back." The "front" is an object direction in the video camera, and an attachment direction in which the accessory unit is slid and attached. The accessory unit covers a video lamp or a flash lamp for illuminating the object, and a microphone for recording images and voices.

In FIGS. 6-10, 601 denotes an accessory side contact holder wholly made of a thermoplastic resin material, such as PBT and LCP. 602 denotes an accessory side cover member wholly made of a thermoplastic resin material, such as PBT and LCP. 603 denotes a contact or contacts made of a metallic material, such as phosphor bronze and copper-titanium alloys, having a good spring characteristic and conductivity.

The accessory side contact holder 601 has a contact holding part 601$x$ and a relay substrate holder 601$y$ that hold the accessory side contacts 603 and the relay substrate 604, respectively as well as accessory side engagement members 601$a$, 601$b$, 601$c$, and 601$d$.

The accessory side engagement members 601$a$ and 601$b$ are provided on the accessory side contact holder 601 at right and left back parts. The "right and left" is a direction corresponding to the above shoe width direction, and will be referred to as an accessory width direction in the following description. The accessory side engagement members 601$a$ and 601$b$ are inserted into between the slide part 101$d$ and the tips of the camera side engagement members 101$a$ and 101$b$ (referred to as "bent tips" hereinafter) which extend parallel to the slide part 101$d$, and engaged with the camera side engagement members 101$a$ and 101$b$. Thereby, the back end of the accessory side contact holder 601 is held by the accessory shoe (camera side engagement plate 101).

The contact holding part 601$x$ is provided in front of the accessory side contact holder 601, and aligns and holds plural accessory side contacts 603 in the accessory width direction at a predetermined pitch for power supply from the camera and communications of the communication signals with the camera.

The above guide wall surfaces 601$n$ and 601$o$ are formed on both side surfaces of the contact holding part 601$x$ in the accessory width direction. The guide wall surfaces 601$n$ and 601$o$ extend straightforward to the front from the accessory side engagement members 601$a$ and 601$b$. In other words, the contact holding part 601$x$ has a constant width in the accessory width direction, and extends ahead from the accessory side engagement member 601$a$ and 601$b$. The contact holding part 601$x$ holds plural accessory side contacts 603, which will be described later. The contact holding part 601$x$ and the accessory side contacts 603 form the accessory side connector.

The accessory side engagement members 601$c$ and 601$d$ are formed on the top of the contact holding part 601$x$ at both sides of the plural accessory side contacts 603 arranged in the accessory width direction. The accessory side engagement members 601$c$ and 601$d$ with the contact holding part 601$x$ are inserted into the engagement space 101$t$ that are formed under the camera side engagement member 101$c$, and engaged with the camera side engagement member 101$c$. Thereby, the accessory shoe (camera side engagement plate 101) holds the front part of the accessory side contact holder 601.

A concave 601$z$ is formed in the front bottom surface of the accessory side contact holder 601, and has plural holes 601$v$ in the concave 601$z$ configured to expose the contact members 603$a$ of the plural accessory side contacts 603.

A convex 601$u$ is formed on the back end top surface of the accessory side contact holder 601. The convex 601$u$ contacts the rear end surfaces of the camera side engagement members 101$a$ and 101$b$, and prevents an erroneous insertion when the accessory unit is inserted into the camera side engagement plate 101 in an opposite orientation.

An accessory side cover member 602 is attached to the accessory side contact holder 601 so as to cover the contact holding part 601$x$ and the top surface of the accessory side contact 603, protects the accessory side contact 603, and prevents unsteadiness of the accessory side contact 603. In other words, the accessory side cover member 602 presses a surface opposite to the contact member 603$a$ of the accessory side contact 603, and prevents deformations of the accessory side contacts when the contact member 603$a$ contacts the camera side contact 103.

The accessory side contact 603 has the contact member 603$a$ that contacts the camera side contact 103 (contact member 103$a$), as described above, and the contact member 603$b$ that contacts the relay substrate 604. The contact member 603$b$ turns to a charged state when contacting the relay substrate 604, and generates a force, thereby securing a contact pressure against the relay substrate 604.

A holding part 603$c$ is formed between both contacts 603$a$ and 603$b$ in the accessory side contact 603, and longer than another part in the direction from the front to the back. The holding part 603$c$ is inserted into a groove formed on the back upper part of the contact holding part 601$x$ of the accessory side contact holder 601. Thereby, the accessory side contact 603 is held by the accessory side contact holder 601.

The relay substrate 604 sends power supplied from the camera via the accessory side contact 603 to a control board (not shown) provided in the accessory unit, and relays a communication between the control board and the camera. A wiring pattern is formed on both surfaces of the relay substrate 604, and a harness connector is provided on one surface. The harness connector is coupled with a harness (not shown).

605 denotes a click spring made of a metallic material, such as a SUS steel plate and a spring phosphor bronze plate, and having a good spring characteristic. The click spring 605 is engaged with and positioned relative to the projection 602$y$ provided in the accessory side cover member 602. The click spring 605 projects to the top of the accessory side engagement member 601$a$ and 601$b$ through openings 601$t$ formed at both sides of the accessory side contact holder 601 in the accessory width direction.

When the accessory unit is attached to or inserted into the accessory shoe, the click spring 605 contacts the top surfaces of the bent tips of the camera side engagement member 101$a$ and 101$b$, elastically deforms, and slides relative to the inner end surfaces. When the accessory unit is inserted into the accessory shoe down to a predetermined attachment position, it is disengaged from the top surfaces of the bent tips of the camera side engagement members 101$a$ and 101$b$, generating a click to notify a user that the accessory unit is inserted into the accessory shoe to the predetermined position.

606 denotes a lock member made of a thermoplastic resin material, such as PC and ABS. Plural projections 606$a$, 606$b$, 606$c$, and 606$d$ are formed on the bottom surface of the lock member 606. The lock member 606 linearly moves in the perpendicular direction as the lock nut 607 rotates, which will be described later.

The projections 606a, 606b, 606c, 606d contact the top surfaces of the camera side engagement members 101a, 101b, and 101c provided on the camera side engagement plate 101, and prevent drop-off of the accessory unit from the camera side engagement plate 101.

The lock member 606 is linearly guided in the perpendicular direction as a result of engagements between a guide projection and a guide groove of the accessory side contact holder 601 and the accessory side cover member 602.

The lock nut 607 is made of a thermoplastic resin material, such as PC and ABS, and its internal circumference is female-threaded. A knurling process is performed for the outer circumference of the lock nut 607 so as to improve the user's rotation operations.

As the lock nut 607 rotates, the lock member 606 linearly moves in the perpendicular direction relative to the accessory side contact holder 601, as described above.

608 denotes a lid ring made of a thermoplastic resin material, such as PC and ABS. The lid ring 608 lids from the bottom so as to prevent a disengagement between the lock member 606 and the lock nut 607 while the lock member 606 is inserted into the lock nut 607.

609 denotes a connection member made of a thermoplastic resin material, such as PC and ABS. The outer circumference of the connection member 609 is male-threaded so that it can be engaged with the female-threaded inner circumference of the lock nut 607.

The connection member 609 has a positioning projection 609g and fixing holes 609h and 609i at its bottom. The positioning projection 609g is inserted into the hole 601g formed so as to position the connection member 609 relative to the accessory side contact holder 601 and the accessory side cover member 602. In addition, screws 611a and 611b are inserted into the fixing holes 609h and 609i so as to fix the connection member 609 relative to the accessory side contact holder 601 and the accessory side cover member 602.

Moreover, the top of the connection member 609 is configured to connect the connection member 609 to the accessory unit body, but a description thereof will be omitted.

Figure 11:
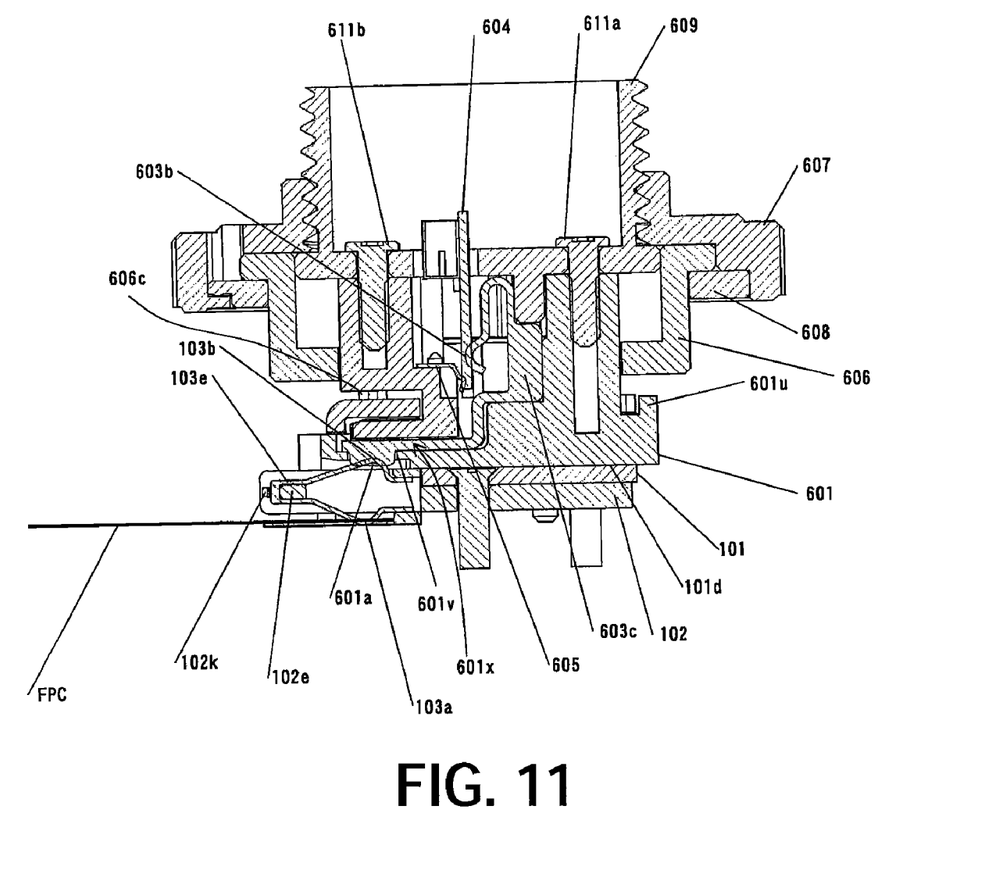
FIG. 11 is a sectional view showing that the shoe attachment member is attached to the accessory shoe according to the embodiment.

The thus-structured shoe attachment member is attached to the accessory shoe as shown in FIG. 11.

A description will now be given of an attachment procedure of the shoe attachment member (accessory unit) to the accessory shoe.

Initially, the lock nut 607 is rotated, and the lock member 606 is moved to a predetermined position in the upper direction. The "predetermined position," as used herein, means a position where none of the projections 606a, 606b, 606c, and 606d contact the camera side engagement members 101a, 101b, and 101c when the shoe attachment member is attached to the accessory shoe.

Next, the shoe attachment member is positioned to the accessory shoe so that the bottom surface of the shoe attachment member (accessory side contact holder 601) can oppose to the slide part 101d of the camera side engagement plate 101. At this time, the accessory side connector (the front part of the accessory side contact holder 601) is positioned above the space between the camera side engagement members 101a and 101b. Thereby, the accessory side engagement member 601a and 601b are positioned slightly behind and above the camera side engagement members 101a and 101b. This state will be referred to as a pre-attachment state in the following description.

Assume that W1 is an interval between the camera side engagement members 101a and 101b in the accessory shoe in the show width direction as shown in FIG. 3 or an interval between the bent tips of both engagement members 101a and 101b (which will be referred to as a "camera side engagement member interval"). In addition, assume that W2 is a width of the camera side connector (102x, 103) in the shoe width direction or a width between the guide wall surfaces 102n and 102o (which will be referred to as a "camera side connector width" hereinafter). Moreover, L1 is a length from the back ends of the guide wall surfaces 102n and 102o to the back ends of the camera side engagement members 101a and 101b.

On the other hand, as shown in FIG. 7, assume that W2' is a width of the accessory side connector (601x, 603) in the accessory width direction or a width between the guide wall surfaces 601n and 601o (which will be referred to as an "accessory side connector width"). Moreover, assume that L1' is a length from the front ends of the accessory side engagement members 601a and 601b in the accessory side contact holder 601 to the front end of the accessory side connector (which will be referred to as an "accessory side connector length").

At this time, the camera side connector width W2 is set equal to or slightly greater than the accessory side connector width W2'. In addition, the camera side engagement member interval W1 is set greater than the width W2' (or greater than the interval W2). The length L1 is slightly greater than the length L1'.

Thus, this embodiment sets the camera side engagement member interval W1 greater than the accessory side connector width W2'. As a result, when the shoe attachment member is downwardly moved from the pre-attachment state, the accessory side connector is inserted into the sliding space 101s through the space between the camera side engagement members 101a and 101b.

In addition, since the sliding space length L1 is only slightly greater than the accessory side connector length L1', the front end of the accessory side connector can sit close to the camera side engagement member 101c. This state will be referred to as a pre-sliding state.

In other words, since the camera side engagement member interval W1 is set enough to allow the accessory side connector having the width W2' to pass, and it makes an overlap between the shoe attachment member and the accessory shoe in the pre-attachment state and the pre-sliding state larger.

When the shoe attachment member is slid to the front from the pre-sliding state, the accessory side connector is inserted into the engagement space 101t between the camera side engagement member 101c and the camera side connector, and engaged with the camera side engagement member 101c. In addition, the accessory side engagement members 601a and 601b proceed in between the camera side engagement members 101a and 102b and the slide part 101d, and are engaged with the camera side engagement members 101a and 102b. The sliding amount is much smaller than that of the prior art shown in FIG. 13 when the entire shoe attachment member is slid from the back of the accessory shoe.

When the accessory side connector is inserted into the deep inside of the engagement space 101t and reaches the front wall part of the camera side engagement member 101c, the contact member 603a of the accessory side contact 603 contacts the contact member 103a of the camera side contact 103. Moreover, the click spring 605 generates a click.

Next, the projections 606a, 606b, 606c, and 606d provided on the lower surface of the lock member 606 are pressed against the top surfaces of the camera side engagement members 101a, 101b, and 101c by rotating the lock nut 607 and by moving down the lock member 606.

The above operation completes the attachment of the accessory unit to the camera. The camera recognizes the attachment of the accessory unit, and starts the power supply from the camera to the accessory unit and the communications between them.

In detaching the camera from the accessory unit, the reverse operation may be performed.

As described above, this embodiment provides, as an engagement portion with the shoe attachment member of the accessory unit, the camera side engagement plate 101 with the engagement members 101a and 101b are apart from each other via the sliding space 101t, and the engagement 101c that is provided in front of them and projects backwardly. The engagement member 101c is configured to engage the accessory side connector that has been inserted into the engagement space 101t that is formed between the engagement member 101c and the camera side connector. This configuration can make the accessory shoe shorter than the length of the conventional accessory shoe in the longitudinal direction and smaller than the sliding amount of the shoe attachment member (or the pre-engagement space necessary behind the accessory shoe).

In addition, the overlap amount between the shoe attachment member and the accessory shoe in the pre-sliding state can be made larger by making the interval between the camera side engagement members 101a and 101b (camera side engagement member interval or the interval between the first and second engagement members) greater than the accessory side connector width. Therefore, the sliding amount of the shoe attachment member and the pre-engagement space can be made smaller.

The camera can be made smaller by using the small accessory shoe that does not need the pre-engagement space.

While the above embodiment discusses the video camera having the accessory shoe, the present invention is applicable to a single lens reflex camera, a compact camera, and another imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298530, filed on Nov. 16, 2007, which is hereby incorporated by reference herein in its entirety.

What is claimed is:

1. An imaging apparatus comprising an accessory shoe, the accessory shoe including:
   an engagement member configured to be engaged with and hold an accessory unit that slides in an attachment direction relative to the accessory shoe, the engagement member forming first, second and third engagement portions integrally as a single element;
   an imaging apparatus side contact configured to be electrically connectable to an accessory side contact that is held by an accessory side contact holder of the accessory unit; and
   an imaging apparatus side contact holder configured to hold the imaging apparatus side contact,
   wherein the first and second engagement portions are provided apart from each other via a slide space in which the accessory side contact holder slides,
   wherein the third engagement portion is provided on a front side of the first and second engagement portions in the attachment direction, projects in a direction opposite to the attachment direction, and covers the imaging apparatus side contact,
   wherein the third engagement portion holds the front part of the accessory side contact holder when the accessory side contact holder is inserted into an engagement space formed between the third engagement portion and the imaging apparatus side contact holder,
   wherein the imaging apparatus side contact holder has a pair of guide wall surfaces which guide the accessory unit to engage the engagement space, the pair of guide wall is provided on the front side of the first and second engagement portions in the attachment direction,
   wherein an interval between bent tips of the first and second engagement portions is greater than a width between the pair of guide wall surfaces of the imaging apparatus side contact holder in the width direction of the accessory shoe.

2. An imaging apparatus according to claim 1,
   wherein the engagement member has an opening on the front side,
   wherein the imaging apparatus side contact and the pair of guide wall surfaces expose to an inside of the engagement space through the opening from an outside of the engagement space.

3. An imaging apparatus according to claim 1,
   wherein tips of the first and second engagement portions are bent toward inside of the slide space,
   wherein tips of the first and second engagement portions are opposed to each other.

4. An imaging apparatus comprising an accessory shoe, the accessory shoe including:
   an engagement member configured to be engaged with and hold an accessory unit that slides in an attachment direction relative to the accessory shoe, the engagement member forming first, second and third engagement portions integrally as a single element;
   an imaging apparatus side contact configured to be electrically connectable to an accessory side contact that is held by an accessory side contact holder of the accessory unit; and
   an imaging apparatus side contact holder configured to hold the imaging apparatus side contact,
   wherein the first and second engagement portions are provided apart from each other via a slide space in which the accessory side contact holder slides,
   wherein the third engagement portion is provided on a front side of the first and second engagement portions in the attachment direction, projects in a direction opposite to the attachment direction, and covers the imaging apparatus side contact,
   wherein the imaging apparatus side contact holder has a pair of guide wall surfaces which guide the accessory unit to engage the engagement space, the pair of guide wall is provided on the front side of the first and second engagement portions in the attachment direction,
   wherein an interval between bent tips of the first and second engagement portions is greater than a width of the front cart of the accessory side contact holder,
   wherein the width of the front part of the accessory side contact holder is equal or slightly smaller than a width of a front part of the imaging apparatus side contact holder.

5. An imaging apparatus according to claim 4,
   wherein tips of the first and second engagement portions are bent toward inside of the slide space,
   wherein tips of the first and second engagement portions are opposed to each other.

* * * * *